Patented Aug. 14, 1951

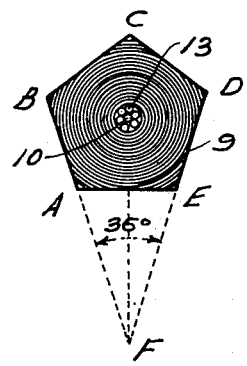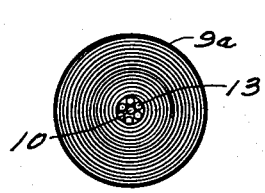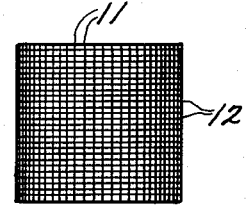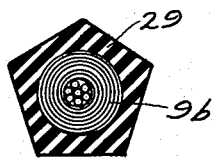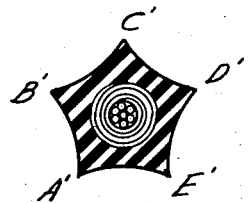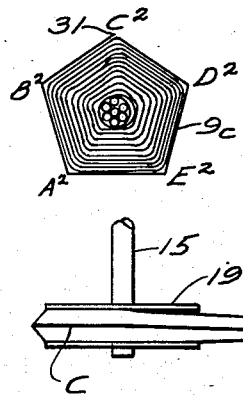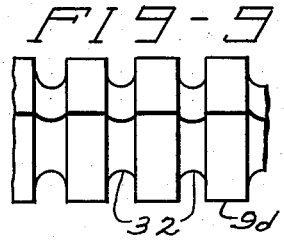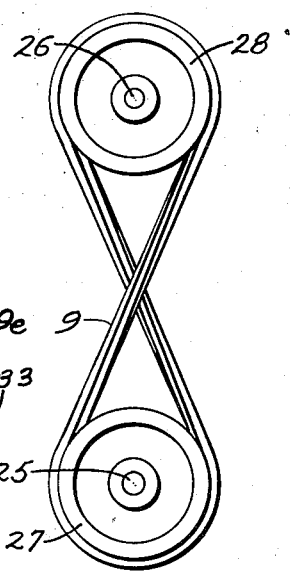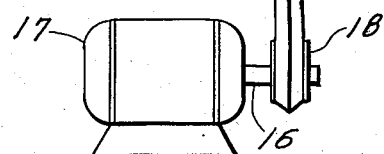

2,564,326

UNITED STATES PATENT OFFICE 2,564,326

POWER TRANSMITTING BELT

Walter R. Dray, Yorkville, Ill.

Application April 5, 1946, Serial No. 659,725

5 Claims. (Cl. 74—233)

This invention relates to driving gear or power transmitting mechanism and more particularly to driving belts that are polygonal in cross section.

One of the principal objects of the invention is the provision of a new and improved power transmitting belt that is so constructed that in reverse drive and in arrangements where the driving and driven shafts are at certain angles to each other a minimum twisting or torsion of the belt is required during the operation thereof.

Another object of the invention is the provision of a new and improved driving belt having a plurality of sets of converging surfaces for cooperating with a plurality of pulleys or sheaves having peripheral V-shaped driving grooves for transmitting power from a driving to a driven shaft.

Another object of the invention is the provision of a driving belt polygonal in cross section that is provided with a core of axially arranged reinforcing cords or members for reinforcing the belt equally efficiently whether one set or another of a plurality of sets of driving surfaces be utilized during the operation of the belt.

A further object of the invention is the provision of a new and improved driving belt that is so constructed that it will bend with equal facility in any of a plurality of planes.

Another object of the invention is the provision of a power transmitting belt that is in the form of a regular pentagon in cross section and preferably, though not necessarily, having axially arranged reinforcing tension cords or strands and with the reinforcing strands and material of the belt symmetrically arranged about the axis of the belt whereby both flexibility of the belt and resistance to tension, as well as resistance to torsion, are provided.

A still further object of the invention is the provision of a new and improved driving belt that is simple in construction, efficient in operation, inexpensive to manufacture, and that is durable.

Other and further objects and advantages of the invention will appear from the following description taken in connection with the accompanying drawings in which Fig. 1 is a cross section of the driving belt; Fig. 2 is a cross section of the belt in one stage of its manufacture; Fig. 3 is a plan view of a short section of the belt shown in Fig. 2 and indicating the cords or strands of the web or fabric employed in the manufacture of the above, by lines extending longitudinally and transversely of the section; Fig. 4 is an elevation of an apparatus shown diagrammatically employing the improved belt for operating a driven shaft at right angles to a driving shaft; Fig. 5 is a side elevation of an apparatus shown more or less diagrammatically for driving a parallel shaft in reverse with said belt; Fig. 6 is a view similar to Fig. 1, showing a modified form of construction; Fig. 7 is a view similar to Fig. 6 but showing a still further modified form of belt; Fig. 8 is a transverse section of the belt shown more in detail; and Figs. 9 and 10 are plan views of portions of further modified forms of symmetrically arranged, regular pentagonal belts.

For operating the different parts of certain kinds or character of machines the belt and pulley type of gear has many advantages over the toothed or chain type, especially where the driving and driven shafts are arranged at various angles to each other.

In recent years, what is known as the V-belt has become very popular as a means for transmitting power from a driving to the driven shaft. The V-belt is in the form of a truncated triangle in cross section and comprises a plurality of plies or layers of rubberized or rubber impregnated woven fabric formed by the application of heat and pressure into an endless unitary belt roughly triangular in cross section with two converging sides constituting driving surfaces. The angle of the driving sides of the V-belt is about 40° which has been adopted as the standard angle.

The cooperating sheaves or pulleys are provided with peripheral V-shaped grooves usually of about 38° for receiving the belt for operating a driven sheave or pulley from a sheave or pulley on a driving shaft. In some instances the driving sides of the belt are covered by additional rubber or rubber material for further minimizing slippage.

This type of belt when used to drive one shaft from another at right angle thereto is caused to twist through 90°, which is objectionable because this continued twisting or torsion of the belt, together with its sharp flexing in running around the pulleys or sheaves tends to separate the constituent plies or layers thereof and cause rapid deterioration of the belt. Likewise, in reverse drive as where the belt is crossed between the pulleys or sheaves, the belt is twisted still further through an angle of 180°, resulting in still greater injury to the belt during the use thereof. Furthermore, this twisting action is resisted more or less by the belt, especially where the driving pulley and driven sheave are close together and the belt is stiff, consequently the belt tends only partially to twist the required amount and thus ride around on its side in the grooves of the pulleys, thereby causing unequal stretching of the tension cords of the belt, which results in rapid deterioration of the belt. A belt running on its side therefore is not only lacking in efficiency because it no longer fits the pulley groove, but also wears rapidly because of undue stretching of some of the cords and slippage of the belt. The shorter the distance between sheaves in such drives, the greater is the tendency of the belt to run on its side in the grooves of the sheaves or pulleys.

Only one set of driving surfaces is provided for the conventional V-belt and consequently these surfaces are in continual use during the operation of the belt. With all the driving done with one set of driving surfaces as in the conventional V-belt, the wear is much greater than where a plurality of sets of driving surfaces are utilized and the life of the belt is correspondingly lengthened.

Belts circular is cross section are not required to be twisted to drive from a plurality of driving surfaces and are used to a considerable extent where a multiplicity of driving surfaces are required and the work is continuously uniform and light. This type of belt is objectionable however, for the reason that the belt makes little better than a line contact with the faces of the V-groove in the driving or driven sheaves or pulleys and as a result, if the work is heavy or intermittent or jerky, it must be run under considerable tension to prevent slippage, which is conducive to wear on the belt.

It has been proposed to use a belt hexagonal in cross section, but the hexagon is not regular because that would mean a 60° wedge angle and that angle would mean little better than a line contact between the belt and the sides of the grooves of the conventional V-pulley. Such angle would not be practical on pulley or sheaves having the conventional 38° grooves. Polygonal belts of a greater number of sides, likewise, cannot be regular in cross section because the angles are too great for the conventional 38° grooves.

In practice the hexagonal belt is formed with the converging driving surfaces approximating a 40° angle and two sets of driving surfaces only are provided, spaced angularly 180° apart. This arrangement permits the belt to drive in reverse from the second set of driving surfaces without twisting the belt, but it must be twisted 90° for driving shafts arranged at right angles to the driving shafts. This type of belt is not entirely satisfactory because of the necessity for twisting the belt 90° where the driven shaft is at a right angle to the driving shaft, and for the further reason that the tension on the outer portion of the belt in turning around pulleys of small diameter is very great indeed due to the excessive amount of belt material radially outwardly from the axis of the belt in running over such sheaves or pulleys.

The present invention seeks to remedy these difficulties by the provision of a belt that is a regular pentagon in cross section and in which the parts are symmetrically arranged. The belt is therefore provided with five sets of equal driving surfaces, each set of which comprises converging driving surfaces forming an angle of 36°, the sets being spaced angularly 72° apart.

The V-grooves in the pulleys are usually about 38° so that a belt having the cross sectional shape of a regular pentagon fits well down into the groove and has rather wide contacting surfaces, whereby there is a minimum of slipping of the belt without undue wedging or without requiring the belt to be very tight. This feature is very important in certain types of machines, especially in certain kinds of farm machinery.

Referring now to the drawings, Fig. 1 is a section of a transmitting belt 9, which is a regular pentagon in cross section and the material is symmetrically arranged about the axis of the belt. The belt is manufactured from a web or webs of square woven cloth, having one set of threads or cords, say the warp 11, Fig. 3 running longitudinally of the fabric, and the other set, the woof 12, running transversely of the web or fabric. One set of these threads or cords when the belt is complete, preferably runs longitudinally of the belt and the other set runs transversely thereof or around the belt at right angles to the first set of threads or cords. The threads may, however, be made to extend across the belt on the bias, if desired, but the belt will resist a greater stretching force if the threads of the fabric extend longitudinally and transversely of the belt. Some or all of the threads or cords that run longitudinally of the belt may be coarser or at least stronger than the other set so as to add tensional strength to the belt without increasing its weight to any material extent. Preferably, though not necessarily, some coarse tension cords, wires, or members 10 and 13 extending axially of the belt, forming a core around which the fabric is disposed or wound, are employed for reducing the stretch of the belt to a minimum during its use. These tension members or strands are disposed closely adjacent to the axis of the belt and are symmetrically arranged about said axis. One of the cords or wires as 10 may extend axially along the belt as shown in Fig. 1 and the remaining cords or wires 13 are either twisted or wound around the strand 10 or are parallel therewith, and are arranged symmetrically about it and closely adjacent thereto, so as to minimize the tension of these cords when the belt is flexed in any direction. Each wire or cord is preferably, though not necessarily, enveloped by a coating of rubber or rubberlike material that will yield slightly for compensating for the slight tendency of these tension members to move or slide relatively to each other when the belt runs around pulleys or sheaves, especially if they be of small diameter.

The fabric is rubberized, or if desired or deemed advisable, it may be heavily impregnated with natural or synthetic rubber, or the layers or plies of fabric may have thin sheets of rubber material inserted between the layers before the belt is molded or is given its final form by the application of heat and pressure. The entire belt before being molded to form may be enveloped with a coat of rubber material for reducing wear on the engaging faces of the belt, as in the construction shown in Fig. 1 or covered with a very heavy layer of rubber as shown in Fig. 6 for resisting wear. This additional sheath of rubber may be dispensed with, if desired.

The belt may comprise a plurality of plies or turns of this rubberized fabric wound around or otherwise positioned about the axially arranged tension members 10 and 13 and the ends and edges of the material are spliced or connected together in any manner well known in the belt and tire art to form an unfinished endless belt circular in cross section as shown at 9a in Fig. 2.

The rolled or assembled belt 9a, including the tension members and fabric as shown in Fig. 2 is then formed into the finished belt 9, which is a regular pentagon, by the application of heat and pressure in a mold or the like.

When the fabric and wrappings for the tension cords are of unvulcanized rubber or rubberized material, the heat and pressure applied to the round or incompleted belt, Fig. 2, by the aid of molds or otherwise, are such as to vulcanize the rubber material and simultaneously mold it into a belt which is a regular pentagon in cross section as shown in Fig. 1, having the material including the tension cords symmetrically arranged about the axis of the belt as shown in Figs. 1, 6 and 7.

In Fig. 4 is shown an apparatus for operating a driven shaft 15 by means of the belt 9 from a driving shaft 16 arranged at a right angle thereto. A cross section of this belt is shown in Fig. 1. The apparatus is shown diagrammatically and comprises a motor 17 having the armature shaft 16, on which is mounted a pulley 18 having the conventional V-groove of, say, 38°. The sheave grooves for the standard 40° belts run all the way from 26° for a small diameter sheave to 38° for a large one. A driven shaft is shown at 15 on which is mounted a sheave or pulley 19 having the conventional V-shaped peripheral groove. The motor shaft rotates about a horizontal axis and it operates the shaft 15 rotating about a vertical axis. A pair of idler V-pulleys 21 or pulleys having V-shaped grooves, only one being shown, arranged side by side are provided for guiding the belt 9. One of these pulleys guides the out-moving section of the belt to the pulley 19 and the return section of the belt is guided to the pulley 18 by the other idler pulley. The belt 9 transmits power from the shaft 16 to the shaft 15.

If the belt were the conventional V-shaped type, with only one set of driving faces, it is evident that in passing from one pulley to the other it must twist through 90° and then back again in passing on to the next pulley, but with the belt 9 the belt need twist only 18°. This is readily seen from an inspection of Fig. 1. In this figure the sides of the pentagon are designated by the letters AB, BC, CD, DE, and EA, respectively. The angle formed by the alternate sides of the polygon form five equal sets of driving faces, which are as follows: 1st set, BA and DE; 2nd set, EA and CB; 3rd set, AB and DC; 4th set, BC and DE; and 5th set, CD and AE. The sides of each set converge outwardly to form a 36° angle, as indicated by the angle EFA, Fig. 1. The angle EFA is 36°, because each of the interior angles of a regular pentagon is 108°, which means that each of the angles FAE and FEA of triangle AEF is 72°, and the remaining angle AFE must therefore be 36°, the difference between 180° and twice 72°.

The core around which the tension members 10 and 13 are disposed may be of any suitable material such as strong cords, wires, or other types of tension members.

Since there are five equal sets of driving surfaces on a regular pentagon belt, these sets are spaced angularly 72°, so if one set of driving surfaces of the belt, say set No. 1, engages the driving pulley 18 then the next adjacent set, either set No. 2 or set No. 5 will engage the idlers 21 in Fig. 4 and the belt need twist only the difference between 90° and 72°, which is 18°. As shown in Fig. 4, the driving surfaces BA and DE, set No. 1, engage the pulley 18, and the surfaces EA and CB of set No. 2 engage the idler 21, so the belt need twist only 18°. In passing from the idler 21 to the pulley 19, the belt is twisted back through 18° to its original untwisted condition. Likewise, in returning from pulley 19 to the other idler 21 the belt is twisted through 18° and is twisted back through 18° to the pulley 18.

Fig. 5 is a diagrammatic showing of a reverse drive. In this construction the power shaft 25 drives the driven shaft 26 in the reverse direction. As shown, the two shafts 25 and 26 are provided with the V-pulleys 27 and 28, respectively. The pulleys are engaged by the first and third sets of driving surfaces of the belt respectively for reversing the direction of rotation of the driven pulley 28 from the driving pulley 27. As pointed out above, where the conventional V-belt requires a 90° twist in the belt the present invention requires the belt to be twisted through only 18°, so where the conventional V-belt requires a twist of 180°, the belt 9 requires a twist of only 36°, the difference between 180° and 144°. As pointed out above, this twist may also be in either direction.

The construction shown in Fig. 6 differs from that shown in Fig. 1 in that the belt 9b has a very heavy or thick layer 29 of rubber or rubber material extending about the belt. This rubber is molded with the belt and becomes an integral part thereof. This arrangement provides a surface that is wear resistant and is long lived.

If desired, each of the sides of the pentagonal faces A'B', B'C', C'D', D'E', and A'E', may be concaved as shown in Fig. 7, which will lighten the belt and at the same time add to its flexibility. The flexing and tension of the belt, especially the outer edge thereof, and the corresponding compression of the inner portion of the belt will slightly distort the angle formed by the driving surfaces, whereby it will form more or less broad contacting faces with the V-groove of the pulleys.

In Fig. 8 is shown a combination in which the belt 9c is made similar to the belt 9 in Fig. 1 and has the five apexes $A^2$, $B^2$, $C^2$, $D^2$ and $E^2$ and corresponding sides forming a regular pentagon in cross section. In this construction, the outer wrapper or outer turn of rubber impregnated fabric forming the belt is so arranged that the edge 31 of this outer layer or wrapper terminates on one of the apexes of the pentagonal belt as at $C^2$, in Fig. 8. By means of this arrangement the outer edge of the wrapper or outer edge 31 of the outer layer does not become a part of any one of the five friction driving surfaces. Where the free or outer edge of the layer or wrapper terminates on the friction or driving surface of the belt, this edge is likely to rub against the adjacent cheek of the sheave, thus soon causing this edge to fray, thereby initiating wearing of the belt.

If desired, the belt in the molding operation may be impressed so as to form a series of grooves transversely around the belt at short intervals apart, as shown at 32 in Fig. 9. The belt 9d in Fig. 9 is a regular pentagon in cross section and the parts are symmetrically arranged about the core as in Figs. 1, 6 and 7. The grooves 32 permit the belt to be more readily flexed in passing around sheaves, especially of small diameter. Belts in passing around pulleys tend to compress or bulge or thicken on their inner or pulley engaging surfaces, thus tensioning the outer surfaces, but with these grooves the parts adjacent to the grooves on the pulley engaging side merely approach each other when the belt is flexed without much undue distortion, either on its inner or outer side.

The construction shown in Fig. 10 is also a belt that is pentagonal in cross section similar to Fig. 1 or Fig. 8 in its interior construction and has its parts symmetrically arranged about a core. Since the arrangement of the core or tension members is substantially the same as has already been described, it is not thought necessary to repeat the description or duplicate the drawing of this feature of the invention. In this form of construction the pentagonal belt 9e has a spiral groove 33 extending about the belt, throughout its extent. This spiral groove facilitates flexing of the belt as in the construction described in Fig. 9. It will be noted that in either form of the construction shown in Figs. 9 and 10, the grooves render the belt easier to flex or bend transversely toward either of the five faces of the belt. In other words, the belt will flex with equal facility in any one of five planes angularly spaced 72° apart. This not only enables the belt to be used with equal efficiency when driving from any of the sets of driving surfaces but also insures a material extension of the life of the belt. The grooved belts of Figs. 9 and 10 are inexpensive to manufacture. Their driving surfaces may be formed by winding the material straight around the core in spaced relation to form the construction shown in Fig. 9; or the material may be wound diagonally around the core with the driving surfaces properly spaced; or the grooves may be made in the wound belt before or after the molding operation.

If desired, the rubber impregnated fabric of all the belts shown may be wound and pressed or molded with the outer or free edge of the fabric terminating at one of the apexes, as shown at 31, in Fig. 8.

It will thus be apparent that one of the material advantages of the symmetrical belt that is a regular pentagon in cross section is that it may be employed where the sheaves are relatively close together and are on shafts that are at various angles to each other.

While the belts shown are of rubber fabric, or fabric that has been rubberized, it is understood that pentagonal belts may be made of other materials, if desired, and that these belts may be used to advantage also where the driving and driven pulleys or shafts are arranged at either acute or obtuse angles to each other.

It is apparent that where the driving and driven shafts are parallel and rotate in the same direction, only one set of driving faces engages the pulleys or sheaves, so that when one set becomes worn, the belt may be made to operate the driven shaft by changing to any one of the other sets of driving surfaces, thus exposing all of the other sets to wear either in rotation or in any other order as may be selected, thus materially prolonging the life of the belt. Likewise, where two sets of driving surfaces on a belt are simultaneously employed, the belt may be turned to use other sets of wearing surfaces, when desired. This is considered an important feature of the invention for it materially prolongs the life of the belt, because of the change in the driving surfaces. Moreover, because of the reduction of the amount of twist in the belt over the normal V-belt under certain driving conditions, the tendency of the belt to come apart and deteriorate is greatly reduced.

While the belts shown are all provided with a tension core, it is understood that the core may be omitted, if desired, especially in belts which are designed for certain kinds of work, or which are made of certain materials.

Many minor variations may be made in the belt without departing from the spirit of the invention, such for instance as making endless belts by mechanically connecting the two ends of rectilinear pieces of belting of the desired length, instead of forming an endless belt by overlapping or splicing the plies or layers of the belt in the usual manner. The invention therefore is not limited to what has been shown and described, but includes any structure falling fairly within the terms of any one or more of the following claims.

I claim as my invention:

1. An endless flexible power transmitting belt having generally throughout its length the cross sectional shape of a regular pentagon whereby each side and the second next adjacent side provide a pair of driving surfaces which are disposed in planes having an angular relationship of substantially 36° and are thereby adapted to make good frictional engagement, with a minimum of slipping and without undue wedging, in the groove of a pulley having walls inwardly converging at an angle of the order of 38°, and whereby the belt may be twisted approximately 18° between two adjacent pulleys having their axes displaced 90° to engage one pair of said driving surfaces with the groove of one pulley and to engage two different driving surfaces with the groove of the other pulley.

2. An endless flexible power transmitting belt having generally throughout its length the cross sectional shape of a symmetrical figure having five equal and similar sides, each side being symmetrically related to a plane which forms an angle of substantially 36° with the plane with relation to which the second next adjacent side is similarly symmetrical, whereby the two sides constituting each of said pairs provide driving surfaces which are adapted to make good frictional engagement, with a minimum of slipping and without undue wedging, in the groove of a pulley having walls inwardly converging at an angle of the order of 38°, and whereby the belt may be twisted approximately 18° between two adjacent pulleys having their axes displaced 90° to engage one pair of said driving surfaces with the groove of one pulley and to engage two different driving surfaces with the groove of the other pulley.

3. An endless flexible power transmitting belt having generally throughout its length the cross sectional shape of a symmetrical figure having five equal and similar concave sides, each side being symmetrically related to a plane which forms an angle of substantially 36° with the plane with relation to which the second next adjacent side is similarly symmetrical, whereby the two sides constituting each of said pairs provide driving surfaces which are adapted to make good frictional engagement, with a minimum of slipping and without undue wedging, in the groove of a pulley having walls inwardly converging at an angle of the order of 38°, and whereby the belt may be twisted approximately 18° between two adjacent pulleys having their axes displaced 90° to engage one pair of said driving surfaces with the groove of one pulley and to engage two different driving surfaces with the groove of the other pulley.

4. An endless flexible power transmitting belt having generally throughout its length outermost surfaces angularly related in the cross sectional shape of a regular pentagon whereby each side and the second next adjacent side provide a pair of driving surfaces which are disposed in planes having an angular relationship of substantially 36° and are thereby adapted to make good frictional engagement, with a minimum of slipping and without undue wedging, in the groove of a pulley having walls inwardly converging at an angle of the order of 38°, whereby the belt may be twisted approximately 18° between two adjacent pulleys having their axes displaced 90° to engage one pair of said driving surfaces with the groove of one pulley and to engage two different driving surfaces with the groove of the other pulley, and said outermost surfaces of said belt being indented with a single continuous spiral groove of low pitch having a transverse directional component exceeding its lengthwise directional component so that the length of each segment of said spiral groove which extends across a side of the belt is longer than the distance lengthwise of the belt between the ends of said segment to facilitate flexing of the belt in any radial direction.

5. An endless flexible power transmitting belt having generally throughout its length outermost surfaces angularly related in the cross sectional shape of a regular pentagon whereby each side and the second next adjacent side provide a pair of driving surfaces which are disposed in planes having an angular relationship of substantially 36° and are thereby adapted to make good frictional engagement, with a minimum of slipping and without undue wedging, in the groove of a pulley having walls inwardly converging at an angle of the order of 38°, whereby the belt may be twisted approximately 18° between two adjacent pulleys having their axes displaced 90° to engage one pair of said driving surfaces with the groove of one pulley and to engage two different driving surfaces with the groove of the other pulley, and said outermost surfaces of said belt being indented with a series of circumferential grooves spaced apart at short intervals along the length of the belt to facilitate flexing of the belt in any radial direction.

WALTER R. DRAY.

REFERENCES CITED

The following references are of record in the file of this patent:

UNITED STATES PATENTS

| Number | Name | Date |
|---|---|---|
| 171,505 | Clark | Dec. 28, 1875 |
| 1,610,942 | Gammeter | Dec. 14, 1926 |
| 1,919,389 | Myers | July 25, 1933 |
| 1,933,899 | Freedlander | Nov. 7, 1933 |
| 1,980,437 | Reeves | Nov. 13, 1934 |
| 1,989,168 | Freedlander | Jan. 29, 1935 |
| 2,296,740 | Reiling | Sept. 22, 1942 |
| 2,347,798 | Reiling | May 2, 1944 |
| 2,404,271 | Brunner | July 16, 1946 |

FOREIGN PATENTS

| Number | Country | Date |
|---|---|---|
| 585,309 | Germany | Oct. 2, 1933 |